J. BOECK.
TURNING SIGNAL FOR VEHICLES.
APPLICATION FILED MAR. 22, 1920.
1,364,348.
Patented Jan. 4, 1921.
2 SHEETS—SHEET 1.
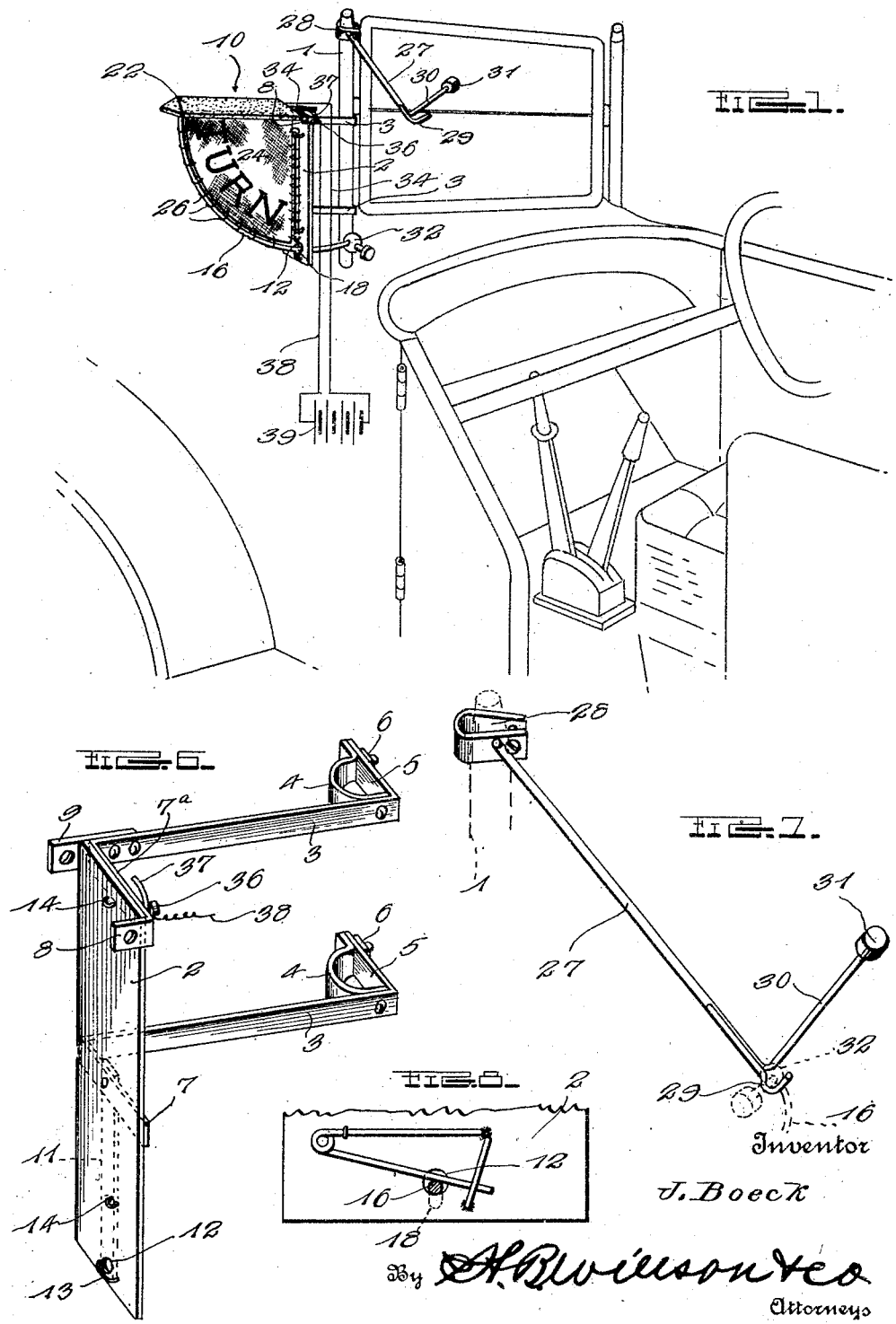

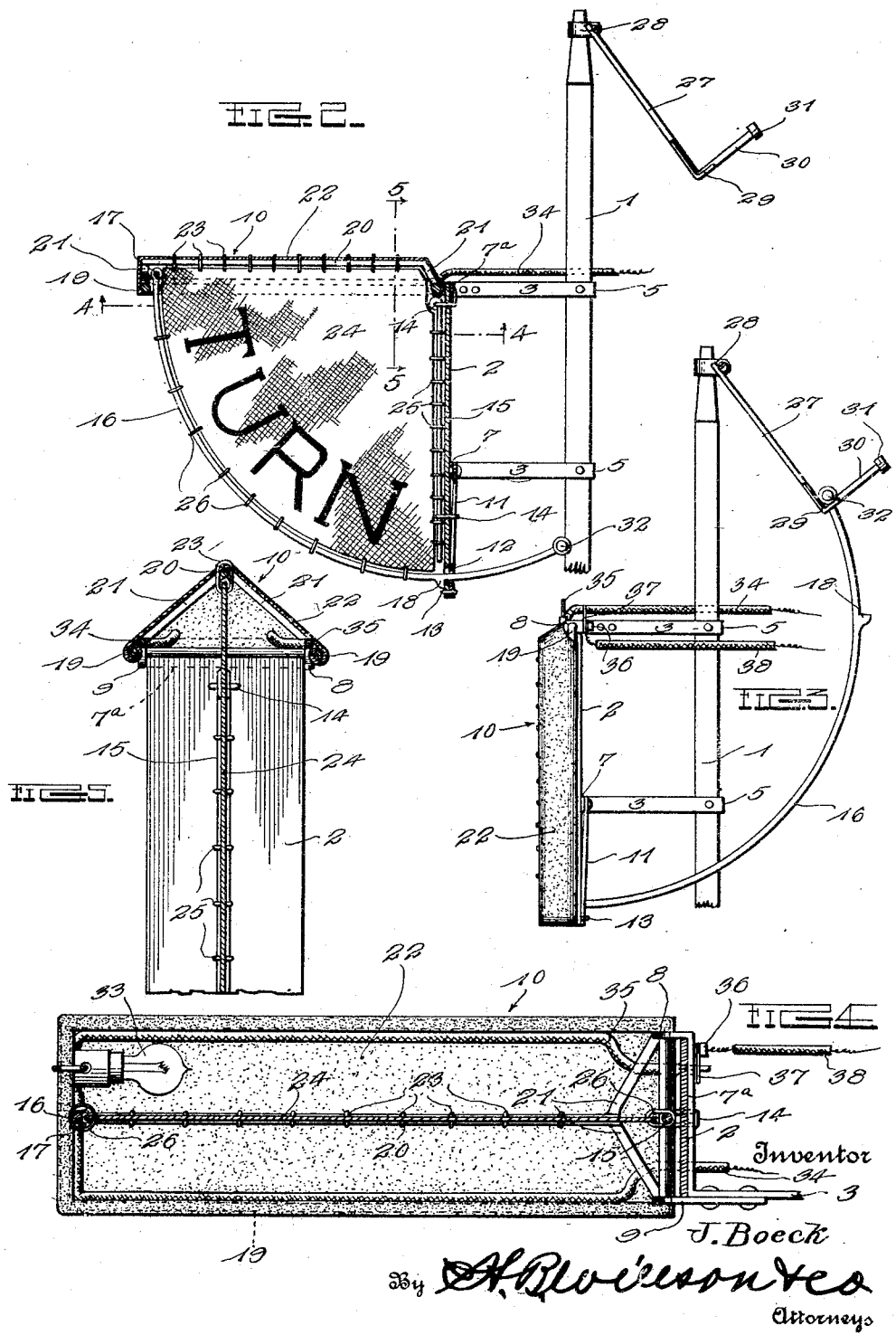

UNITED STATES PATENT OFFICE.

JOHN BOECK, OF BOISE, IDAHO.

TURNING-SIGNAL FOR VEHICLES.

1,364,348.  Specification of Letters Patent.  Patented Jan. 4, 1921.

Application filed March 22, 1920. Serial No. 367,683.

*To all whom it may concern:*

Be it known that I, JOHN BOECK, a citizen of the United States, residing at Boise, in the county of Ada and State of Idaho, have invented certain new and useful Improvements in Turning-Signals for Vehicles; and I do declare the following to be a full, clear, and exact description of the invention, such as will enable others skilled in the art to which it appertains to make and use the same.

This invention relates to turning signals for vehicles.

The object of this invention is to generally improve upon devices of this character by providing an improved housing that shelters the collapsible sign-sheet from rain, snow or sleet, both when the signal is open and closed.

Another object is to provide an improved device of this character which may be quickly and easily attached to one of the upright sides of the support that carries the windshield of the vehicle, and which provides an improved anti-rattling fastener to hold the housing closed.

Other objects and advantages will be pointed out or implied in the following details of description in connection with the accompanying drawings in which:

Figure 1 is a perspective view illustrating a portion of an automobile having my improved turning signal attached thereto.

Fig. 2 is a rear elevation of the turning signal in its open or signaling relation, the same being attached to one of the uprights of a wind-shield support.

Fig. 3 is a view similar to Fig. 2 except that the signaling device is closed and held under spring tension in its closed position.

Fig. 4 is an enlarged horizontal sectional view along the line 4—4 of Fig. 2.

Fig. 5 is an enlarged vertical sectional view along the line 5—5 of Fig. 2.

Fig. 6 is a perspective view illustrating a portion of the supporting structure which is attachable to the remaining portion of the supporting structure, viz., the windshield support.

Fig. 7 is a perspective view of a spring arm which is attachable to the windshield support and engageable with the rod which actuates the signaling device.

Fig. 8 is a detail view showing a spring which can be used to keep the sign locked in its open position.

Referring to these drawings in detail, in which similar reference characters correspond with similar parts throughout the several views, and in which the body and windshield of the automobile are illustrated merely for the purpose of clearly showing the application of the signaling attachment, the invention consists in the details of construction, arrangement and material specifically described hereinafter as follows:

Referring to Fig. 1, it will be seen that the windshield comprises two uprights or posts 1 by which the windshield is supported, and a plate 2 is supported in vertical position on one of the posts 1 by means of a pair of arms 3 which are provided with straps 4 which extend partly around the post 1 and coact with lateral extensions 5 of the arms 3, and with bolts 6 for clamping the supporting post 1 and rigidly uniting the arms 3 therewith. These arms are also provided with lateral extensions 7 and 7ª, respectively. The latter is provided with an offset apertured end 8 which forms a bearing or hinge element. The offset portions 7 and 7ª have the plate 2 rigidly united therewith, by any appropriate means, as illustrated in Fig. 2, and an apertured bearing plate 9 is secured to the main portion of the upper arm 3 and coacts with the bearing portion 8 to form a pivotal bearing for a housing 10 which will hereinafter be described in detail. It will be seen, therefore, that the elements 1, 2, 3 and 4 combine to form a supporting structure for the housing 10. An apertured reinforcing strip 11 is secured to the plate 2 by any appropriate means, and its aperture is in registration with an aperture 12 of the plate 2. A wire loop 13 may extend through apertures in the plate 2 and around the strip 11 for the purpose of holding its lower end in fixed relation to that of the plate 2.

The plate 2 is provided with loops 14 through which a rod 15 extends, and an arcuate actuating rod 16 extends through the aperture 12 and has one end pivotally connected to the interior portion of the housing 10, as illustrated at 17. The rod 16 is provided with a shoulder 18, more clearly shown in Fig. 3, and this shoulder is engageable with the material at the aperture 12 for holding the housing 10 in its elevated or substantially horizontal position.

The housing 10 is preferably formed as illustrated in Figs. 4 and 5, that is, in the shape of a comb-roof, and the construction shown is as follows: A substantially quadrangular wire frame element 19 has one of its end elements engaged with the bearings 8 and 9 to combine therewith in forming a hinge which secures the housing 10 into engagement with the plate 2. A ridge-rod 20 is united with the frame member 19 through the medium of risers 21, so that the resultant frame structure is in the form of an isosceles triangle in cross section, as illustrated in Fig. 5. A covering 22 of oilcloth, leather or other appropriate material, is stitched over and secured to the upper side of the housing frame, and a series of loops 23 is connected to the comb portion of the housing and extended to the interior of this comb portion.

A sign-sheet 24 has one edge engaged with the loops 23 and secured thereby to the inner comb portion of the roof or housing 10. The vertical edge of the sign-sheet is provided with a series of loops or rings 25 through which the rod 15 extends for securing this edge of the sign-sheet or the plate 2. The outer edge of the sign-sheet is preferably arcuate so as to substantially conform to the inner side of the curved actuating rod 16, and this edge of the collapsible sign-sheet is provided with loops or rings 26 through which the actuating rod 16 is slidable.

From the foregoing description, in connection with Fig. 2, it will be seen that the actuating rod 16 may have its rear end raised sufficiently to release the shoulder 18 from engagement with the plate 2 and permit this shoulder to pass through the opening 12. Being thus released from plate 2, the rod may then continue to slide through the opening 2 until it reaches the position shown in Fig. 3. During this movement of the rod, the rings 26 slide on the actuating rod and concentrate within the free end of the housing 10, and at the same time, sign-sheet 24 collapses so as to be received within the housing 10. When the housing 10 is in the vertical position shown in Fig. 3, it is closed by the plate 2, and it is held in this closed position by the coöperation of the actuating rod 16 and the spring arm 27 which is secured to the supporting structure by a clamp 28. This arm 27 is provided with a bifurcated hook 29, one of the furcations 30 being longer than the other and provided with a finger-piece 31. The rod 16, as well as the arm 27 is formed of springy material, and its free end is provided with an enlargement or knob 32 which is engageable with the bifurcated hook 29 as illustrated in Fig. 3, for holding the housing 10 under tension in the closed position, thereby preventing the parts 2 and 10 from rattling against one another, also securing a tight joint between these parts for excluding dirt and moisture. The relatively long furcation 30 renders the engagement of the rod 16 with the hook 29 comparatively easy, for this arm 30 acts as a means for guiding the rod 16 into engagement with the hook 29. It will be seen that the arm 27 and actuating rod lie substantially parallell with the windshield, and are not likely to interfere with the occupants of the automobile, nor to be accidentally interfered with by such occupants; and at the same time, the finger-piece 31 is in a convenient position to be manipulated by the occupants of the machine.

Any appropriate word or words may be printed or otherwise provided on one or both sides of the sign sheet 24, and the same may be illuminated, for night use, by any appropriate means. One means of illuminating the sign-sheet is illustrated in Fig. 4, in which an electric light is shown at 33. A conducting wire 34 is connected to one terminal of the lamp, and a conducting wire 35 is connected to its other terminal. A binding-post 36 is secured to the lateral extension 7ª, and a contact 37 extends from the binding post 36 into the path of the conducting wire 35. A lead or conductor 38 extends from the binding post 26, and the conductors 34 and 38 connect to a battery 39 which may be either the battery which ignites the gas of the machine, or a separate battery.

Although I have described this embodiment of my invention very specifically, it is not intended to limit this invention to these exact details of construction, arrangement and material, but changes may be made without departing from the inventive ideas as implied and claimed.

I claim:

1. In a signal, a plate having an aperture therethrough, means to secure said plate in an upright position, a signal carrying member hinged to the upper end of said plate, an arcuate actuating rod mounted to slide through said aperture and having one end secured to said signal carrying member, and a collapsible sign having one edge secured to said signal carrying member, one edge secured to said plate and one edge provided with means slidingly connecting it to said arcuate rod at a series of points extending substantially from said plate to said housing, said arcuate rod being operable to extend said sign and to hold said signal carrying member in a substantially horizontal position over said collapsible sign and to hold the contiguous edge of said collapsible sign against movement laterally of the arcuate rod.

2. In a signal, a plate having an aperture therethrough, means to secure said plate in an upright position on an upright side of a support, a housing hinged to the upper end of said plate, an arcuate actuating rod mounted to slide through said aperture and having one end secured to said housing, and a collapsible sign-sheet having its edges provided with a series of loops, a plurality of loops on said plate, a securing rod extending through the loops of said plate and through the loops of one edge of said sign-sheet, the loops of another edge of said sign-sheet being engaged with the interior of said housing, the remaining loops being slidingly engaged with said arcuate actuating rod, said actuating rod being operable to hold said housing in a substantially horizontal position and to swing it into a position for coacting with said plate for inclosing said sign-sheet.

3. In a signal, a plate having an aperture therethrough, means to secure said plate in an upright position on an upright side of a support, a housing hinged to the upper end of said plate, said housing comprising a wire frame which is formed as an isosceles triangle in cross section, said housing also comprising a sheet which overlies said frame and is secured thereto to form a comb-roof, a sign-sheet collapsible within said housing and being connected to the housing at its internal comb portion, said sign sheet having one edge connected to said plate, and an actuating member operable to hold said housing in a horizontal position and to permit the housing to swing into a position to coact with said plate for collapsing and inclosing said sign sheet.

4. The combination of a supporting structure, a sign-carrying member hinged to the supporting structure, a springy actuating rod connected to said sign-carrying member and operable to swing it to a horizontal position and permit it to return to a vertical position, and a springy securing arm carried by said supporting structure and provided with a bifurcated hook, said actuating member being provided with an enlargement engageable with said bifurcated hook and coacting therewith to hold said sign-carrying member under tension in its vertical position.

In testimony whereof I have hereunto set my hand.

JOHN BOECK.